Aug. 4, 1959 R. L. STEPHENSON ET AL 2,898,078
VALVE STRUCTURE
Filed Aug. 29, 1957 2 Sheets-Sheet 1
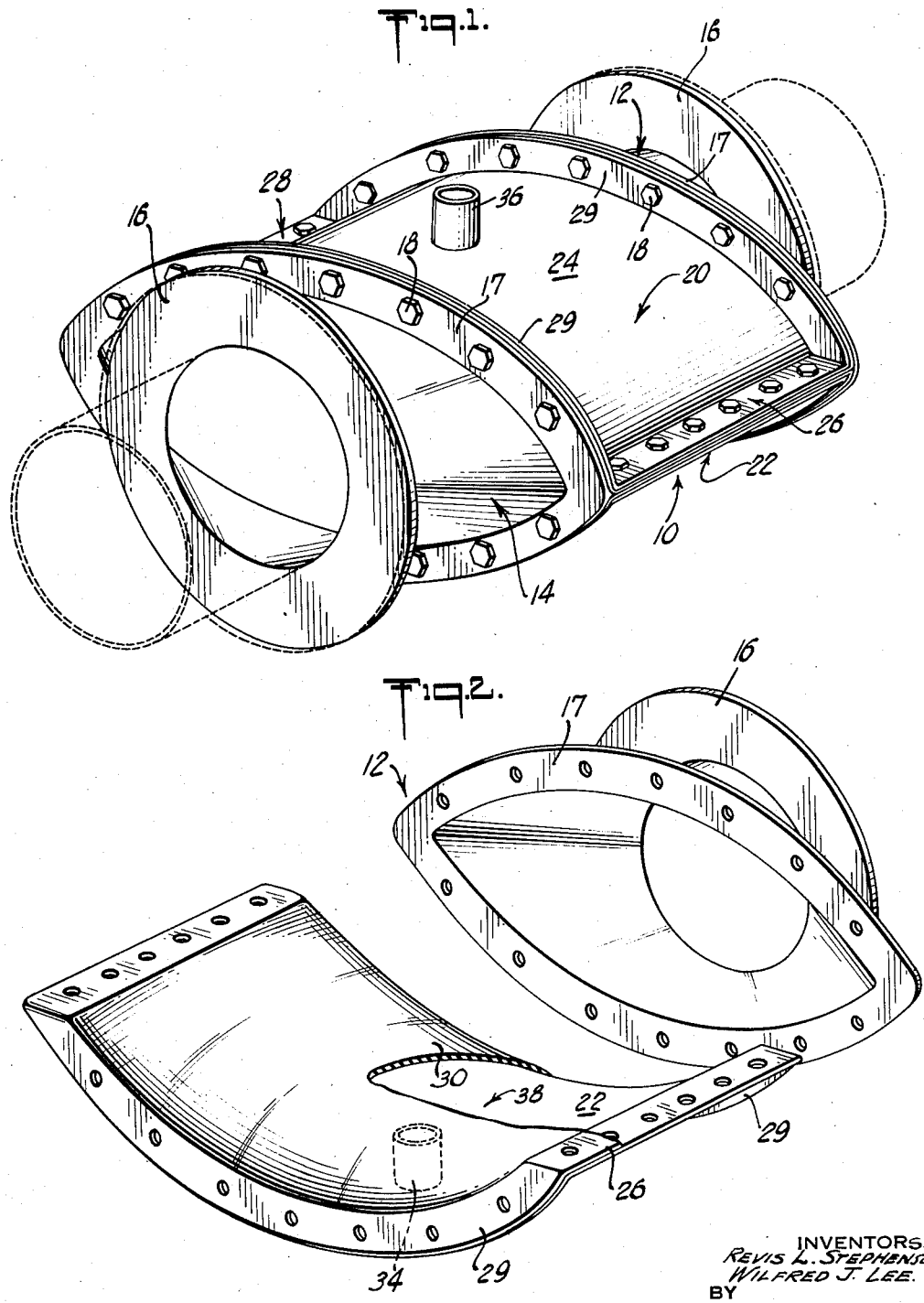
INVENTORS:
REVIS L. STEPHENSON
WILFRED J. LEE
BY
Curtis, Morris & Safford
ATTORNEYS

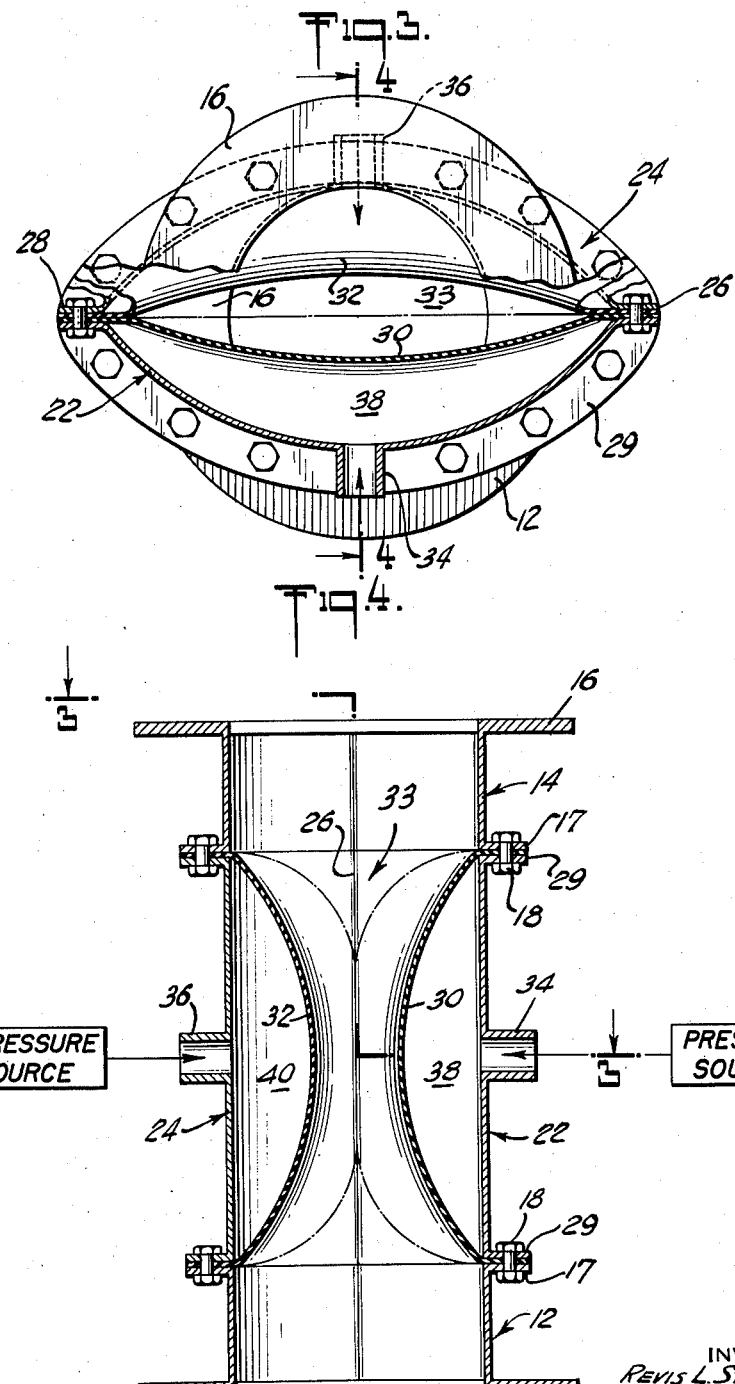

United States Patent Office 2,898,078
Patented Aug. 4, 1959

2,898,078

VALVE STRUCTURE

Revis L. Stephenson, Elmhurst, and Wilfred J. Lee, East Syracuse, N.Y., assignors to United States Hoffman Machinery Corporation, New York, N.Y., a corporation of New York Application August 29, 1957, Serial No. 680,946

3 Claims. (Cl. 251—5)

This invention relates to an improved valve structure and more particularly to one having flexible side walls which can be expanded or contracted by pressure externally applied to open or close the valve.

An object of this invention is to provide a relatively simple and inexpensive valve having greatly improved efficiency and a long service life.

Another object is to provide such a valve which is easy and quick to operate and which can be used to control the flow of sharp or very abrasive materials without damage to itself.

A further object is to provide a valve which can be operated automatically and which will "fail-safe."

These and other objects will in part be understood from and in part pointed out in the description given hereinafter.

A wide and growing variety of materials are conveyed from place to place through pipelines. To control the flow of these materials through the pipelines a number of different types of valves have, of course, already been developed but there is still a pressing need for better and more efficient valves. This is especially true in connection with the handling of difficult materials such as fluid-entrained metal chips, gunpowder, or sewage.

Such materials, even though they contain sizeable solid particles, are easily conveyed in pipes and this is a particularly advantageous way to handle them because of their noxious or dangerous character. Valving or stopping the flow of these materials in the pipelines however, has always been a problem because they tend to erode, or destroy or else prevent the proper operation of valves previously devised.

Perhaps the most widely used kind of valve for materials such as mentioned above is that having flexible side walls which can be squeezed together to restrict or stop flow through it. A typical valve of this kind is shown in U.S. Patent 2,212,733. Unfortunately, a common failing of this general kind of valve has been its relatively low resistance to the abrasive action of the particles or pieces of material flowing through it and its tendency to rupture after repeated opening and closing. The present invention provides an improved valve which has greatly increased resistance to wear and damage and markedly better valving efficiency.

In accordance with the present invention there is provided a valve having two opposed membranes or diaphrams stretched within the housing of the valve to define flexible side walls. These membranes can be further distended toward each other under pressure externally applied to completely close the valve. Tight and complete closing of the valve can be effected with a difference in pressure acting on these membranes of the order of only five pounds per square inch. This means that the valving action is gentle, and any sharp or pointed object pressed between the membranes when closed is not likely to puncture them, especially since they have balloon-like flexibility. The membranes are formed from perfectly flat sheets of any suitable material, such as rubber, and are stretched over curved halves of the valve housing which then fit together and hold the membranes facing each other generally in the form of convexly curved members shaped somewhat like a saddle. Air, or liquid, from an external source can then be forced under moderate pressure into the spaces between the curved halves of the housing and the outer sides of the membranes to press them together and close the valve. The membranes come together first along a line near the center of the housing and transverse to the long axis of the opening through the valve, thereafter they further close progressively enlarging their mutual contact away from this line at right angles to it, and along the axis of the opening. This closing action tends to expel solid matter from between the membranes when they close rather than trap it between them thus insuring more complete sealing of the membranes against each other. Even if an object is by chance caught between the membranes when they close, since they come together over an extended area of contact the valve will still be able to close completely in all but the most unusual cases.

The structure of this valve makes it quite simple to fabricate. The few rigid parts of the housing are not complex or intricate and they can readily be cast or formed. The valve membranes are originally flat, rectangular pieces of a suitable elastic material and these membranes are quite easily positioned in the housing and stretched into the final shape desired during the assembly of the valve. No special molding or fitting is required. The parts of the valve, with the membranes securely clamped in place, are held together in such fashion that they can easily be disassembled for repair if this ever becomes necessary.

Should either one of the membranes in this valve fail for some reason, the other membrane by itself can entirely close the opening through the valve. This means that the valve will "fail-safe," it being assumed that both membranes will not fail at the same time. Because these membranes, after assembly, are clamped face-to-face along their side edges at all times and therefore lie immovably fixed at these edges, there is little or no flexing in this region. This is quite different from the action of the flexible wall valve shown in the above identified patent. There is no tendency in the present valve, in completing its closing, to form a small and decreasing opening alongside its side edges where there is a minimum of flexibility resulting in a maximum of wear. In other words there is no "wire-drawing" effect in the valve. In the present valve the closing motion begins at the sides and progresses to the center where the flexibility is maximum and the wear, consequently, at the minimum, for at the highly flexible center the valve yields easily to the flow, even to solid matter that would abrade unyielding surfaces.

The two membranes in this valve are light in weight and therefore have very low inertia. Consequently, the valve can be opened or closed with extreme speed. In an eight inch valve which has been built and tested, the time required to completely close it from fully open position was less than one second. The sealing action of the membranes of this valve was so gentle that a person's hand could be placed between them without any discomfort. However, the membranes so tightly held the person's hand that he could not withdraw it or even flex his fingers.

A better understanding of the invention together with a fuller appreciation of its many advantages will best be gained from the following description given in connection with the accompanying drawings in which:

Figure 1 is a perspective view of a valve embodying features of the invention;

Figure 2 is an exploded view of parts of the valve, other parts which are the mirror image of those shown being omitted;

Figure 3 is a cross section of the valve taken as indicated by lines 3—3 in Figure 4; and Figure 4 is a longitudinal section of of the valve taken as indicated by lines 4—4 in Figure 3.

The valve shown in Figure 1 includes a housing 10 having two end adapter flanges 12 and 14, which are identical and which are designed to join the valve to the two ends of a pipe line shown in dotted outline. The outer end faces 16 of these flanges are annular and can be fastened to the pipeline in any suitable way as by clamps or by bolts. The inner faces 17 of flanges 12 and 14 are similar to the outer faces but are oval rather than round. These faces are held by the bolts 18 against the central portion 20 of the valve housing.

This central portion 20 consists of two curved shells 22 and 24, which are mirror images of each other, and which are joined along two longitudinal side faces 26 and 28. The ends of these shells define oval lips 29 which fit against, and secure to by means of the bolts 18, the inner faces 17 of the flanges 12 and 14.

As seen in Figure 2, which is an exploded view of the valve showing flange 12 and shell 22, flange 14 and shell 24 being omitted to permit a better view, a thin elastic membrane 30 is stretched over shell 22 and held by attachment along its four edges in arched position upon this shell. A similar membrane 32 (see Figure 3) is likewise stretched over shell 24. These two membranes in their normal rest position in the valve occupy the positions shown by the solid lines in Figures 3 and 4. They are stretched sufficiently taut so that they cover about half of the axial opening 33 through the valve.

The edges of the membranes are clamped along faces 26 between the flanges and shell halves of the housing and a completely tight seal is obtained along these edges by the bolts which hold these parts together.

In order to force the membranes 30 and 32 into sealing contact with each other, as indicated for example by the broken lines in Figures 3 and 4, air or liquid is admitted through the supply lines 34 and 36 into the spaces 38 and 40 between respective membranes and shell pieces. As mentioned previously, in the event that one of the membranes develops a leak, the other, when pressure is applied, will move farther beyond its usual closed position and seal against the inside face of the opposite shell piece thereby closing the valve.

The membranes 30 and 32 can be made of any suitable material but in an eight inch valve which has been built and tested, two sheets of 1/4 inch, No. 30 durometer NG rubber roughly 12 by 20 inches have proved satisfactory.

The above description of the invention is intended as illustration and not in limitation thereof. Various changes may occur to those skilled in the art and these may be made without departing from the spirit or scope of the invention as set forth.

What is claimed is:

1. An improved flexible wall valve having high efficiency and quick response, said valve comprising a housing defining an axial opening therethrough, two thin elastic membranes stretched along their respective edges and supported face-to-face longitudinally along straight lines on opposite sides of said opening within said housing and defining a flow passage through said housing, each membrane defining a closed chamber between itself and the inner side of said housing, and means including two pressure lines each opening into respective ones of said chambers to control the pressure independently behind each of said membranes to force them together and close the valve or to allow them to move apart and open said valve, each of said membranes being sufficiently elastic to expand against the opposite inner side of said housing to close said valve when the other membrane fails, the pressure acting on each membrane being sufficient to expand it against the opposite inner side of said housing in the event the other of said membranes fails.

2. A collapsible side-wall valve of the character described comprising: a first thin, ovally curved housing shell having generally straight, flat sides parallel to its length and curved ends, a thin flat elastic member stretched upon said shell and secured to its ends and sides in roughly saddle-shaped configuration and having a central raised portion lying along a line transverse to said sides, and a second shell and an elastic member stretched upon it, these being the mirror images of the first shell and elastic member, said shells being clamped together along said sides, said membranes together defining a lengthwise opening through said valve, each membrane defining between itself and its respective shell a closed space, and means including a pressure line into each closed space for separately varying the pressure in said spaces between each elastic member and its respective shell to deform said members into contact with each other over an extended area and alternatively to permit them to move apart to permit longitudinal flow of material between them, said elastic members each being sufficiently elastic to expand into contact with the opposite shell, the pressure acting on each membrane being sufficient to expand it against the opposite inner side of said housing in the event the other of said membranes fails.

3. A fail-safe valve of the character described comprising a housing having two identical shell pieces, each piece being ovally curved transverse to its length and straight along its length and defining a central opening lengthwise through said housing, two thin very elastic membranes defining a flow passage through said housing and being positioned between said pieces on opposite sides of said opening, each of said membranes in conjunction with a piece of said housing defining a separate closed spaced and each membrane having sufficient elasticity to expand into contact with the opposite membrane and collapse it against said housing to close said valve in the event said opposite membrane is ruptured, and means including a pressure line into each of said closed spaces to independently control the pressure therein to open or close said valve, the pressure being sufficient to expand either membrane against the opposite inner side of said housing in the event the other membrane is ruptured.

References Cited in the file of this patent

UNITED STATES PATENTS

| 2,828,101 | Antram | Mar. 25, 1958 |

FOREIGN PATENTS

| 437,702 | Italy | of 1948 |
| 1,022,192 | France | of 1953 |